United States Patent [19]
Carlsen et al.

[11] Patent Number: 4,566,761
[45] Date of Patent: Jan. 28, 1986

[54] BIREFRINGENT OPTICAL WAVELENGTH MULTIPLEXER/DEMULTIPLEXER

[75] Inventors: W. John Carlsen, Boston; Paul Melman, Newton, both of Mass.

[73] Assignee: GTE Laboratories Incorporated, Waltham, Mass.

[21] Appl. No.: 650,012

[22] Filed: Sep. 13, 1984

[51] Int. Cl.[4] ............................ G02B 5/30; H04J 1/08
[52] U.S. Cl. ........................................ 350/401; 370/2
[58] Field of Search .................. 350/401, 403; 370/2; 455/616

[56] References Cited

U.S. PATENT DOCUMENTS

| | | | |
|---|---|---|---|
| 2,182,142 | 12/1939 | Ball et al. | 350/401 |
| 3,532,890 | 10/1970 | Denton | 370/2 |
| 3,584,221 | 6/1971 | Furukawa | 370/2 |

FOREIGN PATENT DOCUMENTS 0157003 12/1979 Japan ........................................ 370/2

OTHER PUBLICATIONS

Shirasaki, M. et al, "Compact Optical Isolator for Fibers using Birefringent Wedges", *Applied Optics*, vol. 21, No. 23, Dec. 1, 1982, pp. 4296-4299.

*Primary Examiner*—Bruce Y. Arnold
*Attorney, Agent, or Firm*—Fred Fisher

[57] ABSTRACT

An optical multiplexer/demultiplexer provides for arbitrarily closely spaced wavelength channels, the spacing and locations thereof being determined by the thickness of birefringent crystals such as, for example, quartz. Such a device can also be used for duplexing bidirectional signals. Methods for mechanically tuning the devices to given laser wavelengths are described, as well as simplified constructions which can be used with polarized light sources such as lasers.

8 Claims, 7 Drawing Figures

⊙ PERPENDICULAR POLARIZATION
↕ PARALLEL POLARIZATION

BIREFRINGENT OPTICAL WAVELENGTH MULTIPLEXER/DEMULTIPLEXER

BACKGROUND OF THE INVENTION

1. Field of the Invention

This invention relates to new and improved birefringent optical wavelength multiplexers/demultiplexers. Accordingly, it is a general object of this invention to provide new and improved devices of such character.

2. Purpose of the Invention

Optical wavelength division multiplexing is a technique for combining two or more light beams with different wavelengths along a single optical path. Optical wavelength division demultiplexing involves the separation of these signals from one another at the other end of that path. Optical multiplexers and demultiplexers are often interchangeable with each other.

Optical wavelength division multiplexing and demultiplexing can be used in optical communications systems to multiply the effective information capacity (or signal bandwidth) of a single optical communication pathway. The medium may be optical fiber, free space (or air), water, etc. Individual channels can be transmitted along the path on different optical wavelength carriers, each of which propagates independently of the others.

The multiplexers and demultiplexers described herein (sometimes generically referred to as "multiplexers") provide for an arbitrarily small separation between channel wavelengths so that a required number of channels can be located within an acceptable wavelength range therefor. This feature is especially desirable in dense media, such as glass fibers or water, since such media generally have a very limited wavelength range over which the chromatic optical dispersion is near zero and the total losses are small. For example, for glass, the wavelength range might be approximately 60 nanometers, depending upon the glass. (Contemporary single-mode fibers used at about 1.3 $\mu$m have a wavelength range thereabout.) Outside of this narrow range, additional channels are of little value.

The channel spacing of the multiplexed signals can be as small as desired, as will be made more apparent hereinafter. The size of the spacing is limited primarily by the stability and spectral width of the optical sources that are utilized, such as lasers.

The locations of and spacings between the channel wavelengths can be determined by the thicknesses of prisms in the multiplexers, and these are the only fabrication parameters which generally need be changed to customize the units for a specific application. The devices can be continually tuned by varying the effective thicknesses of the prisms. In the case of a two-channel system, a multiplexer and a demultiplexer can be independently tuned to exactly match the wavelengths of two lasers in the system, so that the laser wavelengths do not have to be precisely specified. Although the invention is primarily applicable to a fiber optical system, it is to be understood that its precepts can be applied to free-space and other optical communications applications, as would be apparent to those skilled in the art.

3. Prior Techniques and Disadvantages Thereof

A. Dichroic beamsplitter method: In the dichroic beamsplitter method, two light signals impinge upon a beamsplitter that is designed to transmit one wavelength and to reflect the other. At the multiplexer end, one wavelength passes through the beamsplitter, and the other wavelength is incident at such an angle that it is reflected by the beamsplitter along the same optical path as the first. Both beams are then coupled by the same optics into a system fiber.

At the demultiplexer end, where the two wavelengths are separated, one wavelength passes through a beam-splitter, while the other wavelength is reflected from the beamsplitter. The individual beams thus separated can then be individually processed. To multiplex or demultiplex more than two wavelength channels, more than one device can, in principle, be used in a tree or series configuration.

Disadvantageously, in practice, such devices have not been able to handle more than three wavelengths with reasonable performance. Because it is difficult to consistently control and reproduce the transmission/reflection characteristics over many channels, with low losses and crosstalk for all channels, it is unlikely that such multiplexers will be useful in future multi-channel applications.

B. Diffraction grating method: A grating is utilized to diffract different wavelengths of light at different angles such that multiple wavelengths are separated from one another in different directions of propagation or combined to form a single beam when incident from multiple angles. Diffraction gratings have the potential advantage that a single device is able to handle more than two wavelengths, while all other previously known types can only handle two sets of wavelengths per stage.

Disadvantageously, diffraction gratings are inherently polarization sensitive. In single mode systems, the continual polarization variations in the fiber result in significant fading problems in the receiver.

Because the angles of diffraction are a sensitive function of wavelength, and are more sensitive for smaller interchannel separations than for larger ones, any change of laser wavelength causes the focused spot of light to wander from the optimal position at the end of the fiber. In demultiplexers, with reasonably wide channel spacings available, this can be somewhat accommodated by utilizing output fibers with much larger diameters than that of the system fiber, or by using detector cells themselves to collect the light.

In grating multiplexers, however, this has not been possible, since the output fiber is the small core system fiber, and in practice, a wandering misalignment has been intolerable for the system. For single-mode systems now becoming dominant in communications, or for closer channel spacings, this problem is even worse.

Because the different wavelengths propagate at several different closely spaced angles, the fabrication of such a device is extremely difficult. The fibers must be bunched very closely together, at specific directions with respect to one another. This usually requires individual adjustments with micromanipulators, or precision fiber-aligning grooves which cannot be adjusted.

C. Holographic devices: Holographic devices are essentially diffraction gratings that are made by the optical technique of holography. Often, the hologram is designed to perform lens type operations as well as diffraction, so some external optics can be eliminated.

Disadvantageously, in addition to the problems with conventional gratings, holographic gratings usually have higher throughput losses, especially when combined with focusing functions.

SUMMARY OF THE INVENTION

Another object of this invention is to provide for a new and improved optical multiplexer and demultiplexer, utilizing neither dichroic filters nor diffraction to achieve wavelength selectivity.

Still another object of this invention is to provide for a new and improved optical multiplexer and demultiplexer utilizing the optical technique of birefringent interferometry.

Yet another object of this invention is to provide for a new and improved optical multiplexer and demultiplexer utilizing no highly wavelength sensitive optical coatings, and in which wide bandwidth antireflection coatings and polarization beamsplitter coatings can be used that do not need to be respecified for each system application.

Still yet another object of this invention is to provide for a new and improved optical multiplexer and demultiplexer in which the channel wavelengths and spacings are determined by the thickness of a single crystal in each unit and in which, otherwise, all units can be identical.

Yet still another object of this invention is to provide for a new and improved birefringent optical wavelength multiplexer/demultiplexer in which, unlike any other previous known multiplexing technique, an individual unit can be independently tuned so that the spacing and location of its wavelength passband can be selected and, in the case of two channels, any two lasers can be selected and the multiplexer/demultiplexer later can be precisely tuned to those wavelengths.

Still yet another object of this invention is to provide for a new and improved optical wavelength multiplexer/demultiplexer in which a standard configuration thereof is insensitive to polarization changes.

And yet still another object of this invention is to provide for a new and improved optical wavelength multiplexer/demultiplexer, which, when multiple units are utilized to multiplex (or demultiplex) more than two channels, only one unit, the one closest to the system link, processes channels which are closest together.

In accordance with one aspect of the invention, a birefringent optical wavelength multiplexer/demultiplexer includes beamsplitting means, reflecting means, and a birefringent element. A first polarization beamsplitting means splits an applied collimated beam of light into two linearly polarized beams whose directions of propagation are perpendicular to each other. A first reflecting means reflects one of the linearly polarized beams parallel to the other polarized beam. A birefringent element having a pair of opposed parallel surfaces, with an optical axis oriented nominally parallel to the surfaces, is oriented with its parallel surfaces perpendicular to the direction of propagation of the linearly polarized beams. The optical axis is oriented half way between the two polarized beams incident upon the element, 45° from the polarization axis of each beam. One electric field component of each polarized beam, parallel to an extraordinary axis of the element, propagates at a different rate of speed, depending upon the material of the element, than the other electric field component which is parallel to an ordinary axis of the element. This may result in a changed polarization state for both beams. A second reflecting means reflects the other polarized beam, following propagation of the other beam through the element, in a direction perpendicular to that of the one polarized beam following propagation of the one polarized beam through the element. A second polarized beam splitting means is oriented to receive both the reflected other beam and the propagated one beam. Thus, (1) when the propagated other beam and the propagated one beam have polarization states which are linearly polarized parallel to the respective applied polarized beams, the reflected other beam is transmitted by the second polarization beam splitting means. The propagated one beam is reflected by the second polarization beam splitting means, whereby the reflected other beam and the propagated one beam are combined and transmitted outwardly from a first port, and (2) when the propagated other beam and the propagated one beam have polarization states which are linearly polarized perpendicular to the respective applied polarized beams, the reflected other beam is reflected by the second polarization beam splitting means. The propagated one beam is transmitted by the second polarization beam splitting means, whereby the reflected other beam and the propagated one beam are combined and transmitted outwardly from the second port.

In accordance with another aspect of the invention, a birefringent optical wavelength multiplexer/demultiplexer includes a first polarization beam splitting means for splitting an applied collimated beam of light into two linearly polarized beams whose directions of propagation are at an angle with one another. A first reflecting means reflects one of the linearly polarized beams parallel to the other. A birefringent element has a pair of opposed parallel surfaces. An optical axis is oriented nominally parallel to the surfaces. The element is oriented with the parallel surfaces perpendicular to the direction of propagation of the linearly polarized beams. The optical axis is oriented half way between the two polarized beams incident upon the element, equiangular from the polarization axis of each beam. One electric field component of each of the polarized beams, parallel to an extraordinary axis of the element, propagates at a different rate of speed, depending upon the material of the element, than the other electric field component which is parallel to an ordinary axis of the element. This may result in a changed polarization state for both beams. A second reflecting means reflects the other of the linearly polarized beams following propagation of the other beam through the element, in the direction perpendicular to that of the one of the polarized beams following propagation of the one polarized beam through the element. A second polarized beam splitting means is oriented to receive both the reflected other beam and the propagated one beam. Thus, (1) when the propagated other beam and the propagated one beam have polarization states which are linearly polarized parallel to the respective applied polarized beams, the reflected other beam is transmitted by the second polarization beam splitting means, and the propagated one beam is reflected by the second polarization beam splitting means, whereby the reflected other beam and the propagated one beam are combined and transmitted outwardly from a first port, and (2) when the propagated other beam and the propagated one beam have polarization states which are linearly polarized perpendicular to the respective applied polarized beams, the reflected other beam is reflected by the second polarization beam splitting means, and the propagated one beam is transmitted by the second polarization beam splitting means, whereby the reflected other beam and the reflected one beam are combined and transmitted outwardly from the second port.

In accordance with still another aspect of the invention, a birefringent multiplexer/demultiplexer includes a tree structure of three comb filter units, A, B and C. Two of the comb filters A and B have a basic channel spacing of 2 $\Delta\lambda$. The comb filter A receives signals at wavelengths $\lambda_1$ and $\lambda_3$ along separate channels thereof and combines them onto a first output path. The comb filter B receives signals at wavelengths $\lambda_2$ and $\lambda_4$ along separate channels of the filter B, having the same channel spacing as the comb filter A but tuned a distance $\Delta\lambda$ away therefrom, and combines the signals $\lambda_2$ and $\lambda_4$ onto a second output path. The first and the second output paths are coupled to two separate ports of the third comb filter unit C which has a channel spacing equal to $\Delta\lambda$, whereby signals at $\lambda_1$ and $\lambda_3$ travel along the first path and signals at $\lambda_2$ and $\lambda_4$ travel along the second path, and all four signals $\lambda_1$, $\lambda_2$, $\lambda_3$ and $\lambda_4$ are combined onto a third output path.

BRIEF DESCRIPTION OF THE DRAWINGS

Other objects, advantages and features of this invention, together with its construction and mode of operation, will become more apparent from the following description, when read in conjunction with the accompanying drawings, in which.

DETAILED DESCRIPTION

This invention is directed to apparatus which multiplexes or demultiplexes any number, n, of wavelength-separated channels, using a tree configuration of $n-1$ birefringent interferometer units. All units in the tree configuration can be identically constructed, although some units may have different lengths of birefringent crystal elements than others.

A birefringent interferometer unit acts as a bidirectional optical comb filter, which transmits alternate wavelength channels along different paths, that is, each of the two transmission paths of the comb filter has a periodic power-vs-wavelength transfer characteristic, each essentially one-half of a period out of phase with the other.

Thus, for a set of discrete wavelengths, $\lambda_1, \lambda_2, \ldots, \lambda_n$, separated by approximately the same amount $\Delta\lambda$, every other wavelength propagates along one of the two possible optical paths through the comb filter, and the wavelengths between them travel along the other path.

Figure 1:
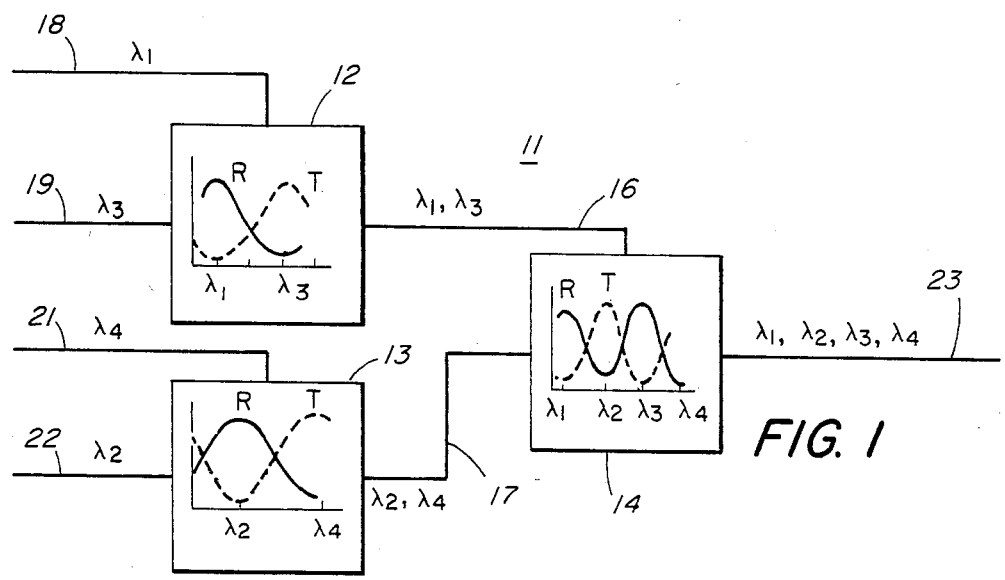
FIG. 1 is a block diagram of a birefringent multiplexer/demultiplexer in accordance with one embodiment of the invention, utilizing a tree structure of comb filter units, each comb filter block in the figure containing a graph of the transfer functions for two transmission paths therethrough, a four channel device being shown by way of illustration and the lines between units representing either interconnecting fibers or freely propagating collimated light beams.

Referring to FIG. 1, there is shown a block diagram of a typical birefringent multiplexer/demultiplexer 11 in accordance with this invention. The birefringent multiplexer/demultiplexer 11 uses a tree structure of comb filter units 12, 13, 14. Each comb filter unit 12, 13, 14, as shown in FIG. 1, contains a graph of the transfer functions for the two transmission paths through it. A four-channel device, as depicted in FIG. 1, is shown for simplicity. The lines 16, 17 between the units represent interconnecting fibers or, alternatively, can represent freely propagating collimated light beams.

Each of the two comb filters 12, 13 has a basic channel spacing of 2 $\Delta\lambda$. The channels have this wavelength separation and travel separately along two transmission paths of the comb filter unit. Each unit 12, 13 has the same channel spacing, but tuned $\Delta\lambda$ away from each other. The two comb filters 12, 13 guide the channels along different paths, separated on the left and combined on the right.

Whereas, as illustrated in FIG. 1, there are four separated propagation paths 18, 19, 21, 22 at the left of the figure, there are only two paths 16, 17 to the right of the units 12, 13, as illustrated in the center of the figure. Each of those two paths 16, 17 carry two of the optical wavelengths freely in either direction. These two paths 16, 17 are coupled into the separated ports of the third comb filter unit 14 at the right of the figure, which third unit 14 has a channel spacing equal to $\Delta\lambda$. Thus, the even channels #2 and #4 are transmitted along one path 17, and the odd channels #1 and #3 take the other path 16. Both paths combine at 23, at the system link side at the right. There, all four channels propagate together, each wavelength able to travel independently in either direction.

As the three comb filters 12, 13, 14 are bidirectional, the entire configuration is bidirectional for each wavelength path. Thus, the overall system heretofore described can be used to multiplex four channels onto a single fiber, for example. A similar unit can be used at the receiving end of the system, in reverse manner, to demultiplex the four channels from one another.

In another embodiment, both ends of the system include both transmitters and receivers, so that the devices at either end can act as multiple wavelength duplexers. For example, any one or more wavelength channels can propagate from left to right, while others propagate from right to left.

Figure 2:
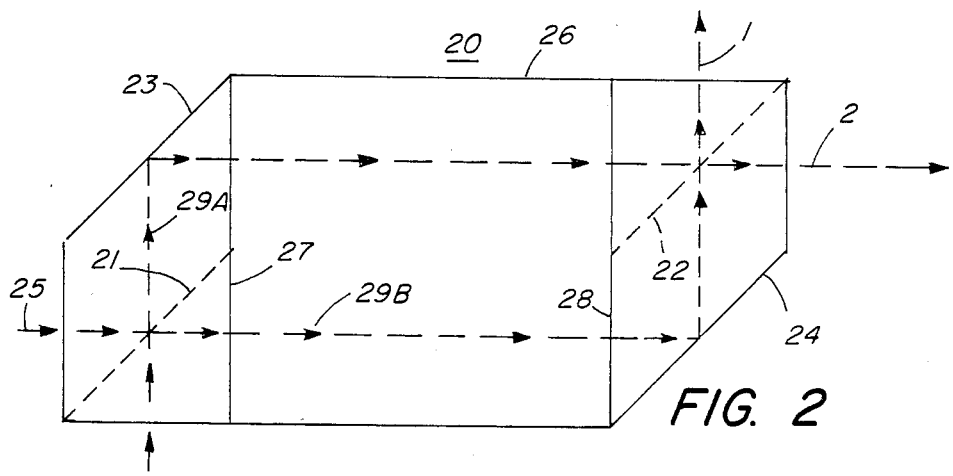
FIG. 2 is a schematic optical diagram of a single comb filter unit in accordance with this invention.
Figure 2A:
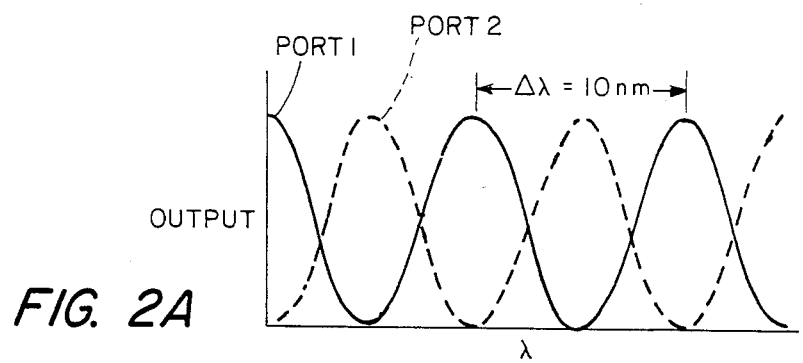
FIG. 2A is a chart of wavelength versus output amplitude for various signals applied to the device of FIG. 2.

Referring to FIG. 2, there is shown a schematic optical diagram of a single comb filter unit 20. The comb filter unit 20 includes two polarization beam splitters 21, 22, two reflecting surfaces 23, 24, and a birefringent element 26 having parallel opposite sides 27, 28. The birefringent element 26 can be crystalline, such as quartz or calcite, but can be, alternatively, any other birefringent material such as stressed plastic, electro-optical material, etc.

The optical axis of the birefringent element 26 is nominally parallel to its two parallel surfaces 27, 28. The optical axis is oriented half way between the axes of polarization of the two beams incident upon it (i.e., 45° from each other). The parallel surfaces 27, 28 are oriented perpendicular to the common direction of propagation of the two beams.

In operation, assume a light beam is provided at the input port 25, at the left of FIG. 2. Output ports 1, 2 are provided at the right, and top right, of the figure, as shown. Alternatively, a pair of light beams can be provided at the right, and top right, for combined output at the left port 25.

In operation, assume a collimated beam of light (whose polarization state is immaterial) enters the input port 25 and is directed onto the first polarization beam splitter 21. The beam splitter 21 splits the beam into two linearly polarized beams 29A, 29B whose directions of propagation can be perpendicular to one another as shown, or at any other angle. The reflecting surface 23 reflects beam 29A parallel to the other 29B, and both beams 29A, 29B enter the birefringent element 26.

Within the birefringent element 26, both beams 29A, 29B undergo essentially the same transformation. The component of the optical electric field vector which is parallel to the extraordinary axis of the material propagates faster or slower, depending upon the material, than the component parallel to the ordinary axis. Thus, upon emerging from the right side of the element 26, as shown in FIG. 2, these two components are out of phase by an amount proportional to the thickness of the birefringent material, and inversely proportional to the optical wavelength. These two vector components combine to yield a polarization state which, depending on the phase, is one of the following: (1) linearly polarized parallel to the input beam polarization, (2) linearly polarized perpendicular to the input beam polarization, or (3) elliptically or circularly polarized.

The beam component 29B that entered the input port 25 and was not reflected by the polarization splitter 21 is reflected by the second reflecting surface 24 towards the second polarization beam splitter 22. The other beam 29A that was reflected by the first polarization beam splitter 21 and the first reflecting surface 23 is also directed to the second polarization beam splitter 22.

When a polarization transformation occurs which is linearly polarized parallel to the input beam polarization, i.e., effectively no change, then the upper beam 29A in FIG. 2 continues onward to the second polarization beam splitter 22, where it is reflected upward toward port 1. The lower beam 29B is reflected by the second reflecting element 24 to the second polarization beam splitter 22, where it is transmitted upward to port 1. Thus, all the light passes through port 1.

When a polarization transformation occurs wherein linearly polarized light perpendicular to the input beam polarization occurs, i.e., rotation by 90°, then the upper beam 29A, in FIG. 2, is transmitted by the second polarization beam splitter 22 to port 2. Similarly, the lower beam 29B is reflected by the second polarization beam splitter 22 to port 2. Thus, all of the light is transmitted through port 2.

When elliptical or circularly polarized light occurs, the light beam has both 0° and 90° components in both beams 29A, 29B, and thus, components of each are transmitted through the two ports 1, 2.

For multiplexing purposes, only the first two types of transformation are desirable, namely, linearly polarized parallel to the light beam polarization or linearly polarized perpendicular to the input beam polarization. Anything else, such as elliptical or circular polarization results in undesirable crosstalk.

For a particular thickness, t, of birefringent material with extraordinary and ordinary indices of refraction, $n_e$ and $n_o$, the first transformation, i.e., linearly polarized parallel to the input beam polarization occurs for wavelengths $\lambda_p$ for which $$\lambda_p = 2(n_e - n_o)t/p,$$

where $p = 2(n_e - n_o)t/\lambda_p$, where $p = 2,4,6, \ldots$, and p is equal to the number of half-wavelengths of retardation that light of wavelength $\lambda_p$ experiences while traversing the thickness t.

Similarly, the second transformation, wherein the vector components are linearly polarized perpendicular to the input beam polarization, occurs for those wavelengths $\lambda_p$ where $$\lambda_p \times 2(n_e - n_o)t/p,$$

where $p = 1,3,5, \ldots$

Although the foregoing formulas are approximate, since it is being assumed that n does not depend upon $\lambda$, they are quite accurate over most domains of interest.

To tune a comb filter 20 to a desired wavelength, it is only necessary to replace the birefringent prism 26 with one having a different thickness. Alternatively, or supplementary, a material can be used with a different $\Delta n$. Further, any technique which changes the overall retardation through the crystal path can be used to tune the wavelength passband.

Figure 3:
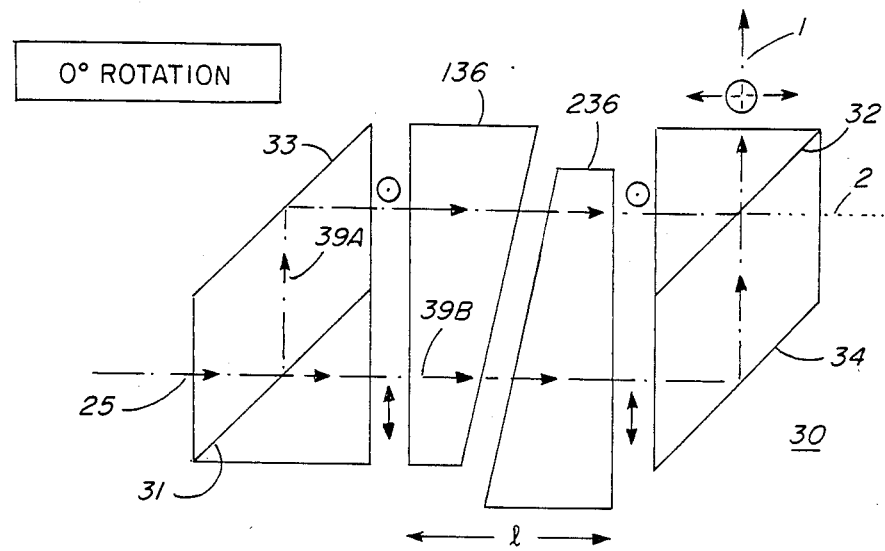
FIG. 3 is a block diagram of a mechanically tunable multiplexer in accordance with another embodiment of the invention.
Figure 3:
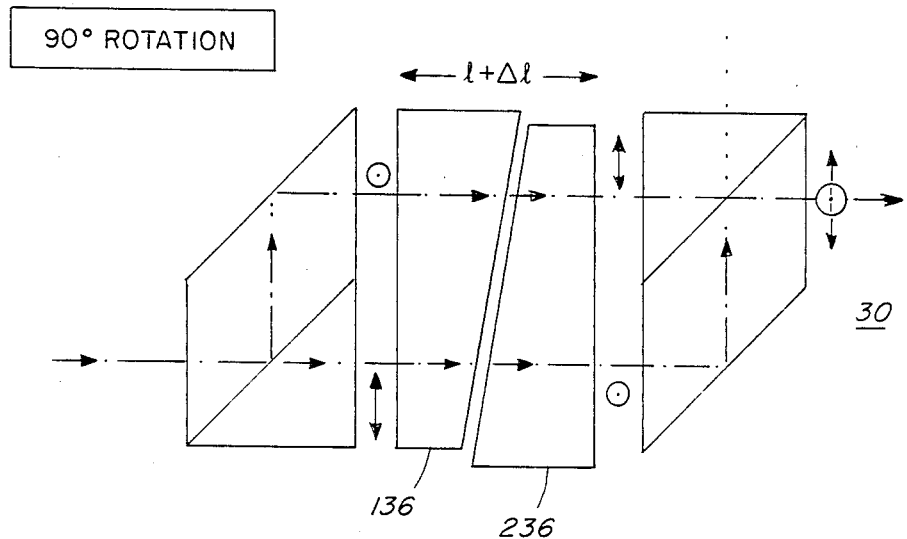

FIG. 3 depicts a mechanically tunable multiplexer 30. The multiplexer 30 utilizes a pair of wedges 136, 236 of birefringent material arranged such that moving one 136 relative to the other 236 changes the effective thickness of the material through which the light propagates, and thus varies the overall retardation. This multiplexer 30 provides for a continuous change in both $\lambda_p$ and $\Delta\lambda$, so that in a two-channel system, the multiplexer 30 can be tuned precisely to the wavelengths of the two lasers to be used in a system, instead of having to precisely specify the wavelengths of the lasers to suit the multiplexer 30.

Figure 4:
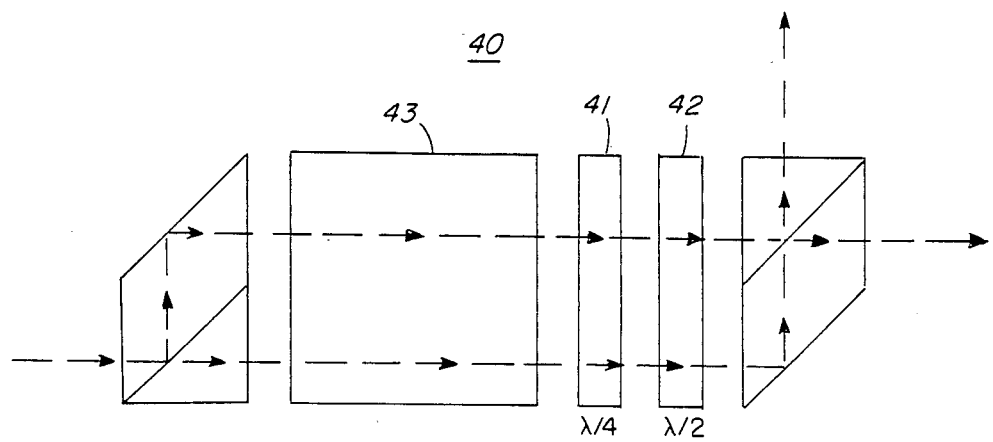
FIG. 4 is a block diagram of a mechanically tunable multiplexer utilizing still another embodiment of the invention.

Another type of mechanically tunable multiplexer 40 is depicted in FIG. 4, which shows two birefringent compensator plates 41, 42 following the main birefringent prism 43. The apparatus in FIG. 4 utilizes a quarter-wave plate 41 oriented at 45° following the main prism 43. The quarter wave plate 41 assures that any light exiting the plate 41 is linearly polarized at some wavelength-dependent angle. The subsequent half-wave plate 42 acts a polarization rotator. Rotation of the half-wave plate 42 continuously changes the wavelengths of light which end at the proper polarization states to exit solely at one exit port 1 or the other 2. Hence, rotating the half-wave plate 42 tunes the entire wavelength passband over a range of approximately one full period.

Various modifications can be performed to this invention without departing from its scope one iota. For example, the configurations described hereinabove generally assume that light enters the multiplexer from a separate signal source, or enters the demultiplexer from a system fiber, having no known polarization state. Such configurations set forth hereinabove are designed to be polarization-insensitive, so that they can perform optimally independent of whether the polarization of each light signal was random, linear, continually changing over time, etc.

In situations where the polarization state is known, simpler designs can be utilized. For example, in the case of a two-channel multiplexer for lasers, when laser light is conducted to the multiplexer without losing its originally highly linear polarization state, then the multiplexer can be reduced to a single polarization beam splitter. At the other end of the fiber, it is highly unlikely that the two signals will maintain their original polarization states, so that a polarization-insensitive demultiplexer would be required. It is noted that this concept is good for a multiplicity of purposes. This particular device can be used for multiplexing, but would likely be more expensive than prior art devices.

Figure 5:
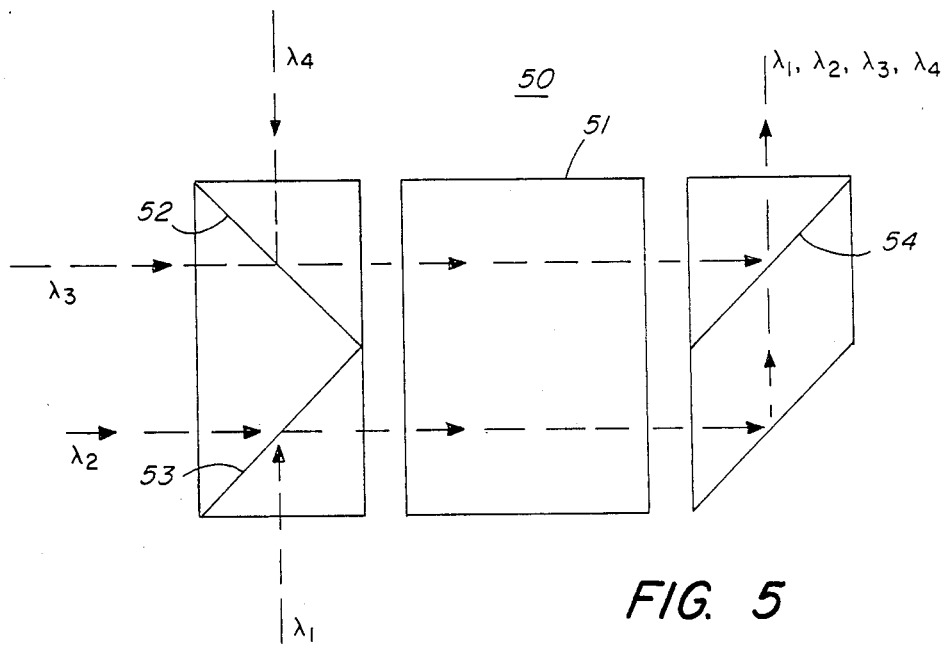
FIG. 5 is a block diagram of a four channel multiplexer utilizing a single birefringent stage in accordance with yet still another embodiment of the invention.

When utilizing more than two channels, the availability of polarized input signals can simplify the multiplexer. Referring to FIG. 5, there is shown a block diagram of a four-channel multiplexer 50 that can be constructed with a single birefringent stage 51, in lieu of three as described hereinabove. The only principal change from the single unit of FIG. 2, as described heretofore, is use of two polarization beam splitters 52, 53, replacing one polarization beam splitter 21, and one of the reflecting surfaces 23. These two beamsplitters are each used here to combine two orthogonally polarized beams, respectively. For even more additional channels, using polarized signals reduces the number of birefringent comb filters units 50 from $n-1$ to $(n/2)-1$, where n is a power of 2.

It is unlikely that all four or more linear polarization states would be preserved in a system fiber; hence, a three-unit polarization insensitive demultiplexer as depicted in FIG. 1 is preferred.

What is claimed is:

1. A birefringent optical wavelength multiplexer/demultiplexer comprising first polarization beam splitting means for splitting an applied collimated beam of light into two linearly polarized beams whose directions of propagation are perpendicular to one another;

first reflecting means for reflecting one of said linearly polarized beams parallel to the other polarized beam;

a birefringent element having a pair of opposed parallel surfaces, with an optical axis oriented nominally parallel to said surfaces, said element being oriented with said parallel surfaces perpendicular to the direction of propagation of said linearly polarized beams, said optical axis being oriented half way between the two polarized beams incident upon said element, 45° from the polarization axis of each said beam, wherein one electric field component of each of said polarized beams which is parallel to an "extraordinary" axis of said element propagates at a different rate of speed, dependent upon the material of said element, than the other electric field component which is parallel to an "ordinary" axis of said element;

second reflecting means for reflecting the other of said linearly polarized beams, following propagation of said other beam through said element, in a direction perpendicular to that of said one of said polarized beams following propagation of said one polarized beam through said element; and second polarization beam splitting means oriented to receive both said reflected other beam and the propagated one beam, wherein (1) when the propagated other beam and the propagated one beam have polarization states which are linearly polarized parallel to said respective applied polarized beams, said reflected other beam is transmitted by said second polarization beam splitting means, and said propagated one beam is reflected by said second polarization beam splitting means, whereby said reflected other beam and said propagated one beam are combined and transmitted outwardly from a first port; and (2) when the propagated other beam and the propagated one beam have polarization states which are linearly polarized perpendicular to said respective applied polarized beams, said reflected other beam is reflected by said second polarization beam splitting means, and said propagated one beam is transmitted by said second polarization beam splitting means, whereby said reflected other beam and said propagated one beam are combined and transmitted outwardly from a second port.

2. A birefringent optical wavelength multiplexer/demultiplexer comprising first polarization beam splitting means for splitting an applied collimated beam of light into two linearly polarized beams whose directions of propagation are at an angle to one another;

first reflecting means for reflecting one of said linearly polarized beams parallel to the other polarized beam;

a birefringent element having a pair of opposed parallel surfaces, with an optical axis oriented nominally parallel to said surfaces, said element being oriented with said parallel surfaces perpendicular to the direction of propagation of said linearly polarized beams, said optical axis being oriented half way between the two polarized beams incident upon said element, equiangular from the polarization axis of each said beam, wherein one electric field component of each of said polarized beams which is parallel to an "extraordinary" axis of said element propagates at a different rate of speed, dependent upon the material of said element, than the other electric field component which is parallel to an "ordinary" axis of said element;

second reflecting means for reflecting the other of said polarized beams, following propagation of said other beam through said element, in a direction perpendicular to that of said one of said polarized beams following propagation of said one polarized beam through said element; and second polarization beam splitting means oriented to receive both said reflected other beam and the propagated one beam, wherein (1) when the propagated other beam and the propagated one beam have polarization states which are linearly polarized parallel to said respective applied polarized beams, said reflected other beam is transmitted by said second polarization beam splitting means, and said propagated one beam is reflected by said second polarization beam splitting means, whereby said reflected other beam and said propagated one beam are combined and transmitted outwardly from a first port; and (2) when the propagated other beam and the propagated one beam have polarization states which are linearly polarized perpendicular to said respective applied polarized beams, said reflected other beam is reflected by said second polarization beam splitting means, and said propagated one beam is transmitted by said second polarization beam splitting means, whereby said reflected other beam and said propagated one beam are combined and transmitted outwardly from a second port.

3. A birefringent optical wavelength multiplexer/demultiplexer comprising first polarization beam splitting means for splitting a first applied collimated beam of light into two linearly polarized beams whose directions of propagation are perpendicular to one another, and for splitting a second applied collimated beam of light into two linearly polarized beams whose directions of propagation are perpendicular, one polarized beam from said first collimated beam being directed along a first path common with one polarized beam of said second collimated beam, and the other polarized beam from said first collimated beam being directed along a second path common with the other polarized beam of said second collimated beam;

first reflecting means for reflecting said one polarized beams to a third path parallel to said second common path;

a birefringent element having a pair of opposed parallel surfaces, with an optical axis oriented nominally parallel to said surfaces, said element being oriented with said parallel surfaces perpendicular to said third path and said second common path, said optical axis being oriented half way between the one polarized beams of both collimated beams and the other polarized beams of both collimated beams incident upon said element, 45° from the ones and the others beams, wherein those components of said polarized beams which are parallel to an "extraordinary" axis of said element propagate at a different rate of speed, dependent upon the material of said element, than the other polarized components which are parallel to an "ordinary" axis of said element;

second reflecting means for reflecting said other polarized beams that have traversed said second common path to a direction perpendicular to said third path; and second polarization beam splitting means oriented to receive the one polarized beams from both collimated beams that have traversed said third path, and said other polarized beams from both collimated beams that have traversed said second common path, wherein (1) when both polarized beams from said first collimated beam combine to yield a polarization state which is linearly polarized parallel to said first applied collimated beam, the reflected other beam of said first collimated beam is transmitted by said second polarization beam splitting means, and said propagated one beam of said first applied collimated beam is reflected by said second polarization beam splitting means, whereby said reflected other beam and said propagated one beam of said first collimated beam are combined and transmitted outwardly from a first port;

(2) when both polarized beams from said second collimated beam combine to yield a polarization state which is linearly polarized perpendicular to said second applied collimated beam, the reflected other beam of said second collimated beam is transmitted by said second polarization beam splitting means, and said propagated one beam of said second collimated beam is reflected by said second polarization beam splitting means, whereby said reflected other beam and said propagated one beam of said second collimated beam are combined and transmitted outwardly from said first port;

(3) when both polarized beams from said first collimated beam combine to yield a polarization state which is linearly polarized perpendicular to said first applied collimated beam, the reflected other beam of said first collimated beam is reflected by said second polarization beam splitting means, and said propagated one beam of said first applied collimated beam is transmitted by said second polarization beam splitting means, whereby said reflected other beam and said propagated one beam of said first collimated beam are combined and transmitted outwardly from a second port; and (4) when both polarized beams from said second collimated beam combine to yield a polarization state which is linearly polarized parallel to said second applied collimated beam, the reflected other beam of said second collimated beam is reflected by said second polarization beam splitting means, and said propagated one beam of said second collimated beam is transmitted by said second polarization beam splitting means, whereby said reflected other beam and said propagated one beam of said second collimated beam are combined and transmitted outwardly from said second port.

4. A comb filter unit comprising a birefringent element having parallel opposite sides, a first polarization beam splitter for splitting a collimated beam of light into two linearly polarized beams whose directions of propagation are at an angle to one another, a first reflecting surface for reflecting one of said polarized beams along a path parallel to the other of said polarized beams, both said other polarized beam and said reflected beam being incident upon one of said parallel sides, for transmission through said element, a second reflecting surface for reflecting the other of said polarized beams following its transmission through the other of said parallel sides, and a second polarization beam splitter for combining said reflected other beam and said reflected one beam and transmitting the combined light through one of two ports.

5. A mechanically tunable optical wavelength multiplexer including a comb filter unit comprising a birefringent element having parallel opposite sides, a first polarization beam splitter for splitting a collimated beam of light at a wavelength λ into two linearly polarized beams whose directions of propagation are at an angle to one another, a first reflecting surface for reflecting one of said polarized beams along a path parallel to the other of said polarized beams, both said other polarized beam and said reflected beam being incident upon one of said parallel sides of said element for transmission therethrough, a second reflecting surface for reflecting the other of said polarized beams following its transmission through the other of said parallel sides, and a second polarization beam splitter for combining said reflected other beam and said reflected one beam and transmitting the combined light through one of two ports, said birefringent element including a pair of wedges of birefringent material, arranged such that moving one relative to the other changes the effective thickness of the material through which the light propagates, and thus varies the overall retardation whereby, a continuous change in both said wavelength $\lambda$ and in channel spacing $\Delta\lambda$ is provided, so that in a 2-channel system, said unit can be tuned precisely to the wavelengths of two signals to be multiplexed.

6. A mechanically tunable optical wavelength multiplexer comprising
a birefringent element having parallel opposite sides,
a first polarization beam splitter for splitting a collimated beam of light into two linearly polarized beams whose directions of propagation are at an angle to one another,
a first reflecting surface for reflecting one of said polarized beams along a path parallel to the other of said polarized beams,
both said other polarized beam and said reflected beam being incident upon one of said parallel sides of said element for transmission therethrough,
a quarter-wave plate oriented, adjacent to the other side of said element, at 45° to an optical axis of said element, and
a rotatable half-wave plate;
a second reflecting surface for reflecting the other of said polarized beams, following its transmission through the other of said parallel sides, said quarter-wave plate, and said half-wave plate, and
a second polarization splitter for combining said reflected other beam and said reflected one beam, following their individual passage through said half-wave plate and transmitting the combined light through one of two ports,
whereby rotation of said half-wave plate tunes the entire wavelength passband over a range of approximately one full period.

7. A four channel optical wavelength multiplexer comprising
a birefringent element having opposed parallel sides;
a first polarization beamsplitter adapted to pass optical signals at a wavelength $\lambda_2$ and to reflect optical signals at wavelength $\lambda_1$, so that both signals at wavelengths $\lambda_2$ and $\lambda_1$ are directed along a first common path incident upon one of said parallel sides of said element;
a second polarization beamsplitter adapted to pass optical signals at a wavelength $\lambda_3$ and to reflect optical signals at wavelength $\lambda_4$, so that both signals at wavelengths $\lambda_3$ and $\lambda_4$ are directed along a second common path, parallel to said first common path, incident upon said one parallel side of said element;
a first reflecting surface for reflecting signals at wavelengths $\lambda_2$ and $\lambda_1$, that have traversed said first common path and said element, at an angle perpendicular to said first common path; and
a third polarization beam splitter for passing said signals at wavelengths $\lambda_1$ and $\lambda_2$, and for reflecting signals at wavelengths $\lambda_3$ and $\lambda_4$ that have traversed said second common path and said element, so that all signals $\lambda_1$, $\lambda_2$, $\lambda_3$, and $\lambda_4$ are outputted along a third common path.

8. A birefringent multiplexer/demultiplexer comprising a tree structure of comb filter units A, B, and C, wherein
two, A and B, of said comb filters have a basic channel spacing of 2 $\Delta\lambda$, said comb filter A receives signals at wavelengths $\lambda_1$ and $\lambda_3$ along separate channels thereof and combines onto a first output path, said comb filter B receives signals at wavelength $\lambda_2$ and $\lambda_4$, along separate channels of said filter B, having the same channel spacing as said comb filter A but tuned a distance away therefrom, and combines said signals $\lambda_2$ and $\lambda_4$ onto a second output path;
said first and said second output paths being coupled to two separated ports of the third comb filter unit C which has a channel spacing equal to $\Delta\lambda$; whereby signals at $\lambda_1$ and $\lambda_3$ travel along the first path, and signals at $\lambda_2$ and $\lambda_4$ travel along the second path, and all four signals $\lambda_1$, $\lambda_2$, $\lambda_3$ and $\lambda_4$ are combined onto a third output path.

* * * * *